(12) United States Patent
Ouradnik et al.

(10) Patent No.: US 8,434,433 B2
(45) Date of Patent: May 7, 2013

(54) HEAT EXCHANGER SYSTEM AND METHOD OF OPERATING THE SAME

(75) Inventors: Zachary Thomas Ouradnik, Racine, WI (US); Martin John Riniker, Franklin, WI (US); Patrick Schoepel, Franklin, WI (US); Gregg D. Olson, Racine, WI (US); Jason Braun, Racine, WI (US)

(73) Assignee: Modine Manufacturing Company, Racine, WI (US)

( * ) Notice: Subject to any disclaimer, the term of this patent is extended or adjusted under 35 U.S.C. 154(b) by 513 days.

(21) Appl. No.: 12/524,913

(22) PCT Filed: Feb. 20, 2008

(86) PCT No.: PCT/US2008/054386
§ 371 (c)(1),
(2), (4) Date: Feb. 18, 2010

(87) PCT Pub. No.: WO2008/103711
PCT Pub. Date: Aug. 28, 2008

(65) Prior Publication Data
US 2010/0163214 A1 Jul. 1, 2010

Related U.S. Application Data

(60) Provisional application No. 60/902,314, filed on Feb. 20, 2007.

(51) Int. Cl.
*F01P 3/00* (2006.01)
(52) U.S. Cl.
USPC .............. 123/41.29; 123/563; 60/599

(58) Field of Classification Search .............. 123/41.29, 123/41.01, 563; 165/104.28, 104.19, 173, 165/140, 150; 60/599
See application file for complete search history.

(56) References Cited

U.S. PATENT DOCUMENTS 3,628,603 A 12/1971 Fieni
4,000,725 A * 1/1977 Harris .............. 123/563
(Continued)

FOREIGN PATENT DOCUMENTS

JP 3427996 7/2000
JP 2002107094 4/2002

OTHER PUBLICATIONS

First Office Action for Chinese Patent Application No. 200880005665.4 (translation), issued Nov. 3, 2010, (5 pages).
(Continued)

*Primary Examiner* — Noah Kamen
*Assistant Examiner* — Long T Tran
(74) *Attorney, Agent, or Firm* — Michael Best & Friedrich LLP

(57) ABSTRACT

The present invention provides a heat exchange system including, among other things, a radiator operable to remove heat from coolant, an air flow path extending through a first charge air cooler and a second charge air cooler, the first charge air cooler being operable to transfer heat from air to the coolant, the second charge air cooler being positioned downstream from the first charge air cooler along the air flow path to receive the air from the first charge air cooler and being operable to transfer heat from the air to the coolant, and a coolant circuit extending between a coolant pump, the radiator, and the first and second charge air coolers.

38 Claims, 1 Drawing Sheet

U.S. PATENT DOCUMENTS

| | | | |
|---|---|---|---|
| 4,049,047 A * | 9/1977 | Keen | 165/104.31 |
| 4,317,439 A * | 3/1982 | Emmerling | 123/563 |
| 4,385,594 A | 5/1983 | Hauser, Jr. | |
| 4,485,867 A | 12/1984 | Melnyk et al. | |
| 4,582,127 A | 4/1986 | Moranne | |
| 4,620,509 A | 11/1986 | Crofts | |
| 4,917,182 A | 4/1990 | Beamer | |
| 4,995,455 A | 2/1991 | Mathur | |
| 5,160,474 A | 11/1992 | Huff | |
| 5,174,372 A | 12/1992 | Potier et al. | |
| 5,178,212 A | 1/1993 | Nakamura | |
| 5,246,065 A | 9/1993 | Huff | |
| 5,415,147 A * | 5/1995 | Nagle et al. | 123/563 |
| 5,424,147 A * | 6/1995 | Khasin et al. | 429/119 |
| 5,669,338 A * | 9/1997 | Pribble et al. | 123/41.29 |
| 5,887,650 A | 3/1999 | Yang | |
| 5,910,099 A | 6/1999 | Jordan, Jr. et al. | |
| 5,974,802 A * | 11/1999 | Blake | 60/605.2 |
| 5,988,268 A | 11/1999 | Usami et al. | |
| 6,006,731 A | 12/1999 | Uzkan | |
| 6,098,576 A * | 8/2000 | Nowak et al. | 123/41.33 |
| 6,145,480 A * | 11/2000 | Betz et al. | 123/41.51 |
| 6,158,398 A | 12/2000 | Betz | |
| 6,370,871 B2 * | 4/2002 | Suzuki et al. | 60/286 |
| 6,609,484 B2 | 8/2003 | Schaffer et al. | |
| 6,883,314 B2 * | 4/2005 | Callas et al. | 60/599 |
| 7,040,303 B2 * | 5/2006 | Uzkan et al. | 123/563 |
| 7,047,913 B2 | 5/2006 | Werner et al. | |
| 7,104,062 B2 * | 9/2006 | Amaral | 60/599 |
| 7,131,403 B1 | 11/2006 | Banga et al. | |
| 7,464,700 B2 * | 12/2008 | Kolb | 123/563 |
| 2005/0000473 A1 | 1/2005 | Ap et al. | |
| 2006/0061044 A1 | 3/2006 | Merklein et al. | |
| 2006/0185362 A1 | 8/2006 | Rogg et al. | |
| 2006/0236987 A1 | 10/2006 | Guerrero | |

OTHER PUBLICATIONS

Office Action from the Patent Office of the People's Republic of China for Application No. 200880005665.4 dated Dec. 23, 2011 (Translation and Original, 9 pages).

* cited by examiner

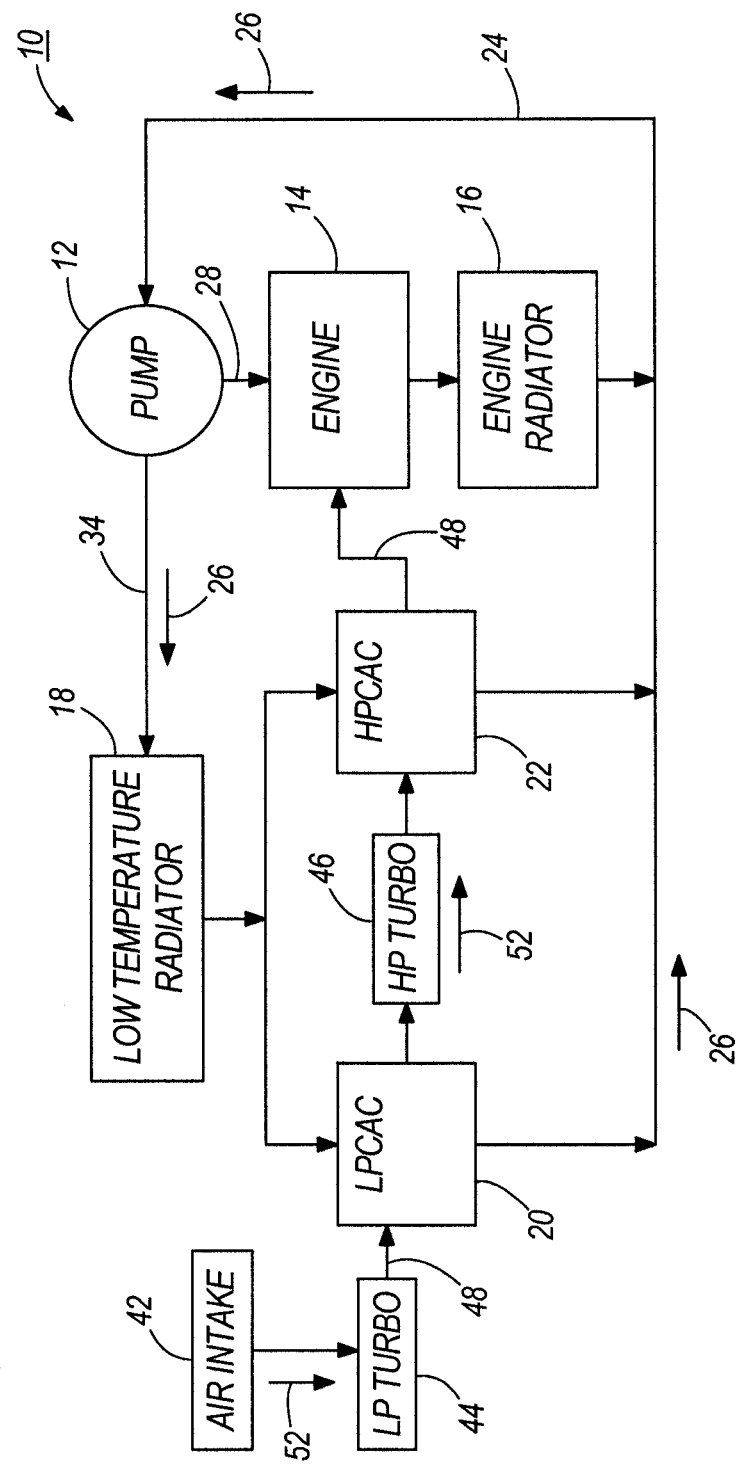

HEAT EXCHANGER SYSTEM AND METHOD OF OPERATING THE SAME

CROSS-REFERENCE TO RELATED APPLICATIONS

This patent application is a national stage filing under 35 U.S.C. 371 of International Application No. PCT/U.S.2008/054386, filed 20 Feb. 2008, and claims priority to U.S. provisional patent application, Ser. No. 60/902,314, filed Feb. 20, 2007, the entire contents of which are incorporated herein by reference.

FIELD OF THE INVENTION

The present invention relates to heat exchange systems, and more particularly, to heat exchange systems for cooling charge air in vehicle engines and methods of operating such systems.

SUMMARY

In some embodiments, the invention provides a heat exchange system extending through a vehicle engine. The system can include a first charge air cooler and a second charge air cooler arranged in parallel to receive a first working fluid from a radiator. Each of the first and second charge air coolers can be operable to transfer heat between the first working fluid and a second working fluid. In some embodiments, the second working fluid travels through a first turbo charger before entering the first charge air cooler and travels through a second turbo charger before entering the second charge air cooler.

The invention also provides a heat exchange system extending through a vehicle engine, the system including a first charge air cooler, a second charge air cooler, and a pump for supplying a first working fluid non-sequentially to both the first and second charge air coolers. Each of the first and second charge air coolers can be operable to transfer heat between the first working fluid and a second working fluid.

In some embodiments, the present invention provides a heat exchange system including a radiator operable to remove heat from coolant and an air flow path extending through a first charge air cooler and a second charge air cooler. The first charge air cooler can be operable to transfer heat from air to the coolant. The second charge air cooler can be positioned downstream from the first charge air cooler along the air flow path to receive the air from the first charge air cooler and being operable to transfer heat from the air to the coolant. The heat exchange system can also include a coolant circuit extending between a coolant pump, the radiator, and the first and second charge air coolers.

The present invention also provides a heat exchange system including a radiator being operable to remove heat from coolant and a coolant circuit extending between a coolant pump, a radiator, and first and second charge air coolers. Pressure differences along the coolant flow path can distribute a first predetermined quantity of the coolant from the radiator to the first charge air cooler and a second predetermine quantity of coolant from the radiator to the second charge air cooler. The heat exchange system can also include an air flow path extending through the first and second charge air coolers. The first and second charge air coolers can be operable to transfer heat from air traveling along the air flow path to the coolant traveling along the coolant circuit through the first charge air cooler and to the coolant traveling through the second charge air cooler.

In addition, the present invention provides a method of operating a heat exchange system including the acts of directing a coolant along a coolant circuit through a pump and a radiator, dividing the coolant from the radiator between a first charge air cooler and a second charge air cooler, directing air along an air flow path through the first charge air cooler and the second charge air cooler transferring heat from the air to the coolant in the first charge air cooler, and transferring heat from the air to the coolant in the second charge air cooler.

The present invention also provides a method of operating a heat exchange system including the acts of directing air along an air flow path sequentially through a first turbo charger, a first charge air cooler, a second turbo charger, and a second charge air cooler, and controlling pressure differences along a coolant circuit to divide coolant traveling along the coolant circuit and exiting a radiator into each of a first charge air cooler and a second charge air cooler.

Other aspects of the invention will become apparent by consideration of the detailed description and accompanying drawings.

BRIEF DESCRIPTION OF THE DRAWING

FIG. 1 is a schematic representation of a heat exchange system according to some embodiments of the present invention.

DETAILED DESCRIPTION

Before any embodiments of the invention are explained in detail, it is to be understood that the invention is not limited in its application to the details of construction and the arrangement of components set forth in the following description or illustrated in the following drawings. The invention is capable of other embodiments and of being practiced or of being carried out in various ways. Also, it is to be understood that the phraseology and terminology used herein is for the purpose of description and should not be regarded as limiting. The use of "including," "comprising," or "having" and variations thereof herein is meant to encompass the items listed thereafter and equivalents thereof as well as additional items. Unless specified or limited otherwise, the terms "mounted," "connected," "supported," and "coupled" and variations thereof are used broadly and encompass both direct and indirect mountings, connections, supports, and couplings. Further, "connected" and "coupled" are not restricted to physical or mechanical connections or couplings. In addition, terms such as "first" and "second" are used herein for purposes of description and are not intended to indicate or imply relative importance or significance.

FIG. 1 illustrates a heat exchange system 10 for use in a vehicle, such as, for example, a truck, a tractor-trailer combination, a bus, a van, an automobile, farm equipment, off-road vehicles, etc. In some embodiments of the present invention, the heat exchange system 10 can include a pump 12, a first radiator 16, a second radiator 18, a first charge air cooler 20, and a second charge air cooler 22 positioned along and fluidly connected by a heat exchange circuit 24. As shown in FIG. 1, at least a portion of the heat exchange system 10 can extend through the vehicle engine 14.

In some embodiments, the pump 12 is operable to direct a first quantity of a relatively low temperature working fluid (e.g., water, a water-glycol mix, and the like) (represented by arrows 26 in FIG. 1) along a branch 28 of the heat exchange circuit 24 toward the vehicle engine 14. The working fluid 26 then travels through the vehicle engine 14 or a portion of the vehicle engine 14. As the working fluid 26 travels through the vehicle engine 14, heat can be transferred from the vehicle engine 14 to the working fluid 26, thereby elevating the temperature of the working fluid 26 and cooling the vehicle engine 14 or a portion of the vehicle engine 14.

Although not shown in FIG. 1, the heat exchange system 10 can also or alternatively include a heating element positioned along the heat exchange circuit 24. In some embodiments, high temperature working fluid 26 exiting the vehicle engine 14 can be directed through the heating element to provide heat to the passenger space of the vehicle. In some such embodiments, the heating element supplements the heat provided to the passenger space by a primary passenger space heating element.

From the vehicle engine 14, or alternatively from the heating element, the working fluid 26 travels along the heat exchange circuit 24 through the branch 28 toward the first radiator 16. In some embodiments, the first radiator 16 can be positioned in or adjacent to the vehicle engine 14. In other embodiments, the first radiator 16 can be positioned in other locations around the vehicle.

As the working fluid 26 travels through the first radiator 16, heat can be transferred from the working fluid 26 to the atmosphere, or alternatively, to a coolant flowing through the first radiator 16. In this manner, the first radiator 16 lowers the temperature of the working fluid 26. From the first radiator 16, the working fluid 26 travels along the heat exchange circuit 24 and back to the pump 12 to be re-circulated through the heat exchange circuit 24.

As mentioned above, the pump 12 is operable to direct a first quantity of a relatively low temperature working fluid 26 along the branch 28 of the heat exchange circuit 24 toward the vehicle engine 14. In some embodiments, the pump 12 is also or alternatively operable to direct a second quantity of the working fluid 26 along a branch 34 toward the second radiator 18.

As the working fluid 26 travels through the second radiator 18, heat can be transferred from the working fluid 26 to the atmosphere, or alternatively, to a coolant flowing through the second radiator 18. In this manner, the second radiator 18 lowers the temperature of the working fluid 26.

From the second radiator 18, the working fluid 26 travels along the heat exchange circuit 24, through the branch 34 toward the first charge air cooler 20 or alternatively, through the branch 34 toward the second charge air cooler 22. In some embodiments, approximately 40% by volume of the working fluid 26 is directed to the first charge air cooler 20 and approximately 60% by volume of the working fluid 26 is directed to the second charge air cooler 22. In other embodiments, an approximately equal volume of the working fluid 26 is directed to each of the first and second charge air coolers 20, 22. In still other embodiments, approximately 60% by volume of the working fluid 26 is directed to the first charge air cooler 20 and approximately 40% by volume of the working fluid 26 is directed to the second charge air cooler 22. In yet other embodiments, the heat exchange circuit 24 can direct different volumes of the working fluid 26 to each of the first and second charge air coolers 20, 22.

In embodiments, such as the illustrated embodiment of FIG. 1, in which the working fluid 26 is directed to either of the first and second charge air coolers 20, 22, the flow of the working fluid 26 through the heat exchange circuit 24 and the distribution of the working fluid 26 to each of the first and second charge air coolers 20, 22 can be at least partially controlled by maintaining the pressure of the working fluid 26 traveling through one or more of the elements of the heat exchange system 10 within a desired range. In some such embodiments, the heat exchange system 10 can distribute a desired volume of the working fluid 26 to each of the first and second charge air coolers 20, 22 without the use of valves or other flow-control or flow-regulating apparatus. In other embodiments, the heat exchange system 10 can also or alternatively include a valve or other flow-control or flow-regulating apparatus positioned along the heat exchange circuit 24.

As shown in FIG. 1, the vehicle engine 14 can include an air intake 42, a first turbo charger 44, and a second turbo charger 46 arranged along an air flow path 48. As also shown in FIG. 1, the air flow path 48 can extend through or past the first and second charge air coolers 20, 22.

In some embodiments, atmospheric air (represented by an arrow 52 in FIG. 1) enters the air flow path 48 through the air intake 42 at approximately atmospheric pressure and travels toward the first turbo charger 44. As the air 52 travels through the first turbo charger 44, the air 52 is compressed, thereby elevating the temperature of the air 52.

The compressed air 52 then travels along the air flow path 48 toward the first charge air cooler 20, where heat is transferred from the air 52 to the working fluid 26, thereby elevating the temperature of the working fluid 26 and lowering the temperature of the air 52. The air 52 then continues along the air flow path 48 toward the second turbo charger 46, and the working fluid 26 then continues along the heat exchange circuit 24 and is returned to the pump 12 to be re-circulated through the heat exchange circuit 24.

As the air 52 travels through the second turbo charger 46, the air 52 is further compressed and the temperature of the air 52 is increased. The compressed air 52 then travels along the air flow path 48 toward the second charge air cooler 22, where heat is transferred from the air 52 to the working fluid 26, thereby elevating the temperature of the working fluid 26 and lowering the temperature of the air 52. The air 52 then continues along the air flow path 48 toward the vehicle engine 14, and the working fluid 26 then continues along the heat exchange circuit 24 and is returned to the pump 12 to be re-circulated through the heat exchange circuit 24.

In some embodiments, the first and second turbo chargers 44, 46, the first and second charge air coolers 20, 22, and/or the other elements of the heat exchange system 10 are designed together as an integral system such that the heat exchange system 10 is operable to supply low temperature working fluid 26 to the first and second charge air coolers 20, 22 on high temperature days (i.e., when the ambient temperature is greater than or equal to approximately 25° C.). Alternatively or in addition, the first and second turbo chargers 44, 46, the first and second charge air coolers 20, 22, and/or the other elements of the heat exchange system 10 are designed to minimize the pressure drop experienced by the working fluid 26 and to prevent the working fluid 26 from boiling while traveling through the heat exchange circuit 24.

In some embodiments, the heat exchange system 10 of the present invention is operable to maintain a relatively constant intake manifold temperature. More particularly, the first and second charge air coolers 20, 22 are operable to maintain the temperature of air entering the intake manifold at or within a relatively narrow range surrounding a desired operating temperature. In some embodiments, the temperature of the air entering the intake manifold can be further regulated using a system controller and/or a valve arrangement for regulating the flow of working fluid 26 through the first and second radiators 16, 18. Moreover, because the intake manifold temperature is maintained at a relatively constant temperature, the vehicle engine 14 can be operated relatively efficiently, thereby reducing emissions and minimizing fuel consumption.

In some embodiments, the heat exchange system 10 is also or alternatively operable to warm the vehicle engine 14 or a portion of the vehicle engine 14 on cold days. In some such embodiments, as the working fluid 26 travels through the heat exchange circuit 24, the working fluid 26 distributes heat from the first and/or second turbo chargers 44, 46 to the vehicle engine 14 or portions of the vehicle engine 14, thereby effectively preheating the vehicle engine 14.

The embodiments described above and illustrated in the figures are presented by way of example only and are not intended as a limitation upon the concepts and principles of the present invention. As such, it will be appreciated by one having ordinary skill in the art that various changes are possible.

What is claimed is:

1. A heat exchange system comprising:
   a radiator operable to remove heat from coolant;
   an engine intake air flow path extending through a first charge air cooler and a second charge air cooler, the first charge air cooler being operable to transfer heat from air to the coolant, the second charge air cooler being positioned downstream from the first charge air cooler along the engine intake air flow path to receive the air from the first charge air cooler and being operable to transfer heat from the air to the coolant; and
   a coolant circuit extending between a coolant pump, the radiator, and the first and second charge air coolers.

2. The heat exchange system of claim 1, wherein the first and second charge air coolers are arranged in a parallel flow arrangement along the coolant circuit.

3. The heat exchange system of claim 1, wherein the air enters the engine intake air flow path before traveling through a first turbo charger, the first charge air cooler, a second turbo charger, the second charge air cooler, and into a vehicle engine.

4. The heat exchange system of claim 3, wherein the first turbo charger is positioned along the engine intake air flow path upstream from the second charge air cooler.

5. The heat exchange system of claim 3, wherein the second turbo charger is positioned along the engine intake air flow path downstream from the first charge air cooler and upstream from the second charge air cooler.

6. The heat exchange system of claim 1, wherein the coolant circuit is a branch of a coolant flow path, and wherein the pump directs a first quantity of the coolant into the coolant circuit and directs a second quantity of the coolant through a second branch extending through the engine.

7. The heat exchange system of claim 6, wherein the second branch extends through an air-cooled radiator before returning cooled coolant to the pump.

8. The heat exchange system of claim 7, wherein the radiator is a first radiator and the air-cooled radiator is a second radiator, and wherein the first radiator is positioned along the first branch of the coolant flow path to receive coolant from the pump before the coolant is directed along the coolant circuit to the first or second charge air coolers.

9. The heat exchange system of claim 1, wherein coolant from the radiator is divided between the first and second charge air coolers.

10. The heat exchange system of claim 1, wherein pressure differences along the coolant circuit distribute a first predetermined quantity of the coolant from the radiator to the first charge air cooler and a second predetermined quantity of coolant from the radiator to the second charge air cooler so that no valves are required.

11. A heat exchange system comprising:
    a radiator being operable to remove heat from coolant;
    a coolant circuit extending between a coolant pump, the radiator, and first and second charge air coolers, pressure differences along the coolant circuit distributing a first predetermined quantity of the coolant from the radiator to the first charge air cooler and a second predetermined quantity of coolant from the radiator to the second charge air cooler; and
    an engine intake air flow path extending through the first and second charge air coolers, the first and second charge air coolers being operable to transfer heat from air traveling along the engine intake air flow path to the coolant traveling along the coolant circuit through the first charge air cooler and to the coolant traveling through the second charge air cooler.

12. The heat exchange system of claim 11, wherein the second charge air cooler is positioned downstream from the first charge air cooler along the engine intake air flow path to receive the air from the first charge air cooler.

13. The heat exchange system of claim 11, wherein at least two turbo chargers are arranged along the engine intake air flow path.

14. The heat exchange system of claim 13, wherein air enters the engine intake air flow path before traveling through a first one of the at least two turbo chargers, the first charge air cooler, a second one of the at least two turbo chargers, the second charge air cooler, and into a vehicle engine.

15. The heat exchange system of claim 14, wherein at least one of the at least two turbo chargers is arranged downstream from the first charge air cooler along the engine intake air flow path.

16. The heat exchange system of claim 15, wherein an other of the at least two turbo chargers is arranged upstream from the first charge air cooler along the engine intake air flow path.

17. The heat exchange system of claim 11, wherein the coolant circuit is a branch of a coolant flow path, and wherein the pump directs a first quantity of the coolant into the coolant circuit and directs a second quantity of the coolant through a second branch extending through the engine.

18. The heat exchange system of claim 17, wherein the second branch extends through an air-cooled radiator before returning cooled coolant to the pump.

19. The heat exchange system of claim 17, wherein the radiator is a first radiator, wherein the second branch extends through a second radiator before returning cooled coolant to the pump, and wherein the first radiator is positioned along the first branch of the coolant flow path to receive coolant from the pump before the coolant is directed along the coolant circuit to the first or second charge air coolers.

20. A method of operating a heat exchange system, the method comprising the acts of:
    directing a coolant along a coolant circuit through a pump and a radiator;
    dividing the coolant from the radiator between a first charge air cooler and a second charge air cooler;
    directing air along an engine intake air flow path through the first charge air cooler and the second charge air cooler;
    transferring heat from the air to the coolant in the first charge air cooler; and
    transferring heat from the air to the coolant in the second charge air cooler.

21. The method of claim 20, further comprising directing coolant exiting at least one of the first charge air cooler and the second charge air cooler through a vehicle engine to preheat the vehicle engine.

22. The method of claim 21, further comprising maintaining a substantially constant engine intake manifold temperature.

23. The method of claim 20, further comprising dividing coolant exiting the radiator between the first and second charge air coolers.

24. The method of claim 20, wherein directing air along the engine intake air flow path through the first charge air cooler and the second charge air cooler includes directing the air sequentially through a first turbo charger, the first charge air cooler, a second turbo charger, the second charge air cooler, and into a vehicle engine.

25. The method of claim 20, wherein directing the coolant along the coolant circuit through the pump, the radiator, the first charge air cooler, and the second charge air cooler includes directing a first quantity of coolant through a first branch of a coolant flow path, and further comprising directing a second quantity of the coolant through a second branch extending through a vehicle engine.

26. The method of claim 25, wherein directing the second quantity of the coolant through the second branch includes directing the second quantity of coolant through an air-cooled radiator before returning cooled coolant to the pump.

27. The method of claim 26, wherein directing the second quantity of the coolant through the second branch includes dividing coolant exiting the pump between the first and second branches to supply coolant to the first and second charge air coolers and the vehicle engine, respectively.

28. The method of claim 20, wherein dividing the coolant from the radiator between the first charge air cooler and the second charge air cooler includes directing a first predetermined quantity of coolant from the radiator toward the first charge air cooler and directing a second predetermined quantity of coolant from the radiator toward the second charge air cooler.

29. The method of claim 20, further comprising controlling pressure differences along the coolant circuit to direct predetermined quantities of the coolant traveling along the coolant circuit into each of the first and second charge air coolers.

30. A method of operating a heat exchange system, the method comprising the acts of:
directing air along an engine intake air flow path sequentially through a first turbo charger, a first charge air cooler, a second turbo charger, and a second charge air cooler; and
controlling pressure differences along a coolant circuit to divide coolant traveling along the coolant circuit and exiting a radiator into each of the first charge air cooler and the second charge air cooler.

31. The method of claim 30, wherein the coolant circuit includes a pump, and further comprising directing coolant from the first and second charge air coolers into the pump and directing at least some of the coolant from the pump into the radiator.

32. The method of claim 30, further comprising directing coolant exiting at least one of the first charge air cooler and the second charge air cooler through a vehicle engine to preheat the vehicle engine.

33. The method of claim 32, further comprising maintaining a substantially constant engine intake manifold temperature.

34. The method of claim 30, wherein directing air along the engine intake air flow path through the first charge air cooler and the second charge air cooler includes directing the air into a vehicle engine from the second charge air cooler.

35. The method of claim 34, further comprising directing the coolant along the coolant circuit through a pump, the radiator, the first charge air cooler, and the second charge air cooler by directing a first quantity of coolant through a first branch of a coolant flow path, and by directing a second quantity of the coolant through a second branch extending through the engine.

36. The method of claim 35, wherein directing the second quantity of the coolant through the second branch includes directing the second quantity of coolant through an air-cooled radiator before returning cooled coolant to the pump.

37. The method of claim 35, wherein directing the second quantity of the coolant through the second branch includes dividing coolant exiting the pump between the first and second branches to supply coolant to the first and second charge air coolers and the vehicle engine, respectively.

38. The method of claim 30, further comprising dividing the coolant from the radiator between the first charge air cooler and the second charge air cooler by directing a first predetermined quantity of coolant from the radiator toward the first charge air cooler and by directing a second predetermined quantity of coolant from the radiator toward the second charge air cooler.

* * * * *

UNITED STATES PATENT AND TRADEMARK OFFICE
CERTIFICATE OF CORRECTION

PATENT NO.       : 8,434,433 B2                                                     Page 1 of 1
APPLICATION NO.  : 12/524913
DATED            : May 7, 2013
INVENTOR(S)      : Ouradnik et al.

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 784 days.

Signed and Sealed this
Eighth Day of September, 2015

Michelle K. Lee
*Director of the United States Patent and Trademark Office*